April 26, 1949.  L. L. SALFISBERG  2,468,517
METHOD AND MACHINE FOR PACKAGING
OR WRAPPING OF ARTICLES
Filed Aug. 10, 1945  2 Sheets-Sheet 2
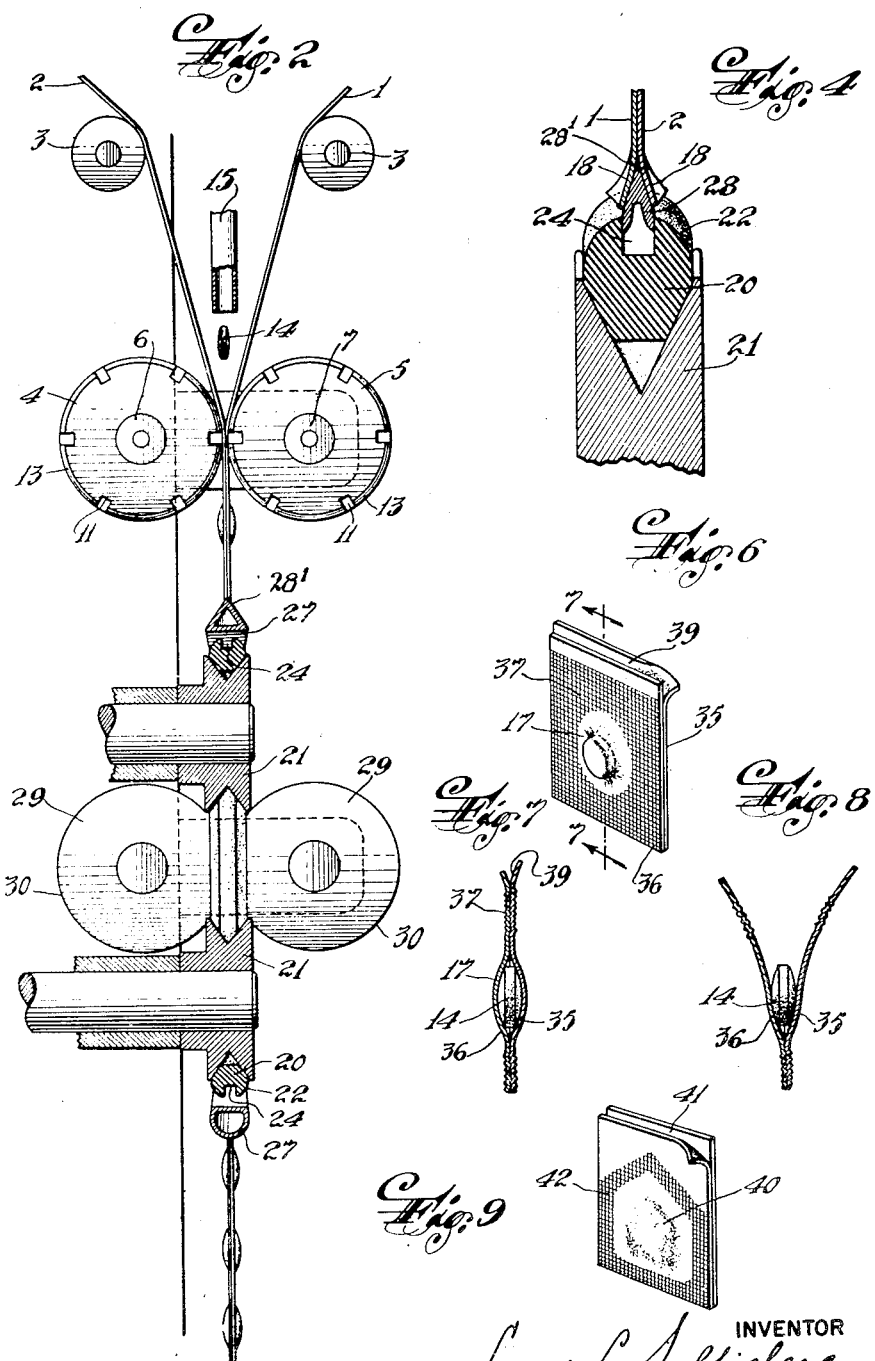

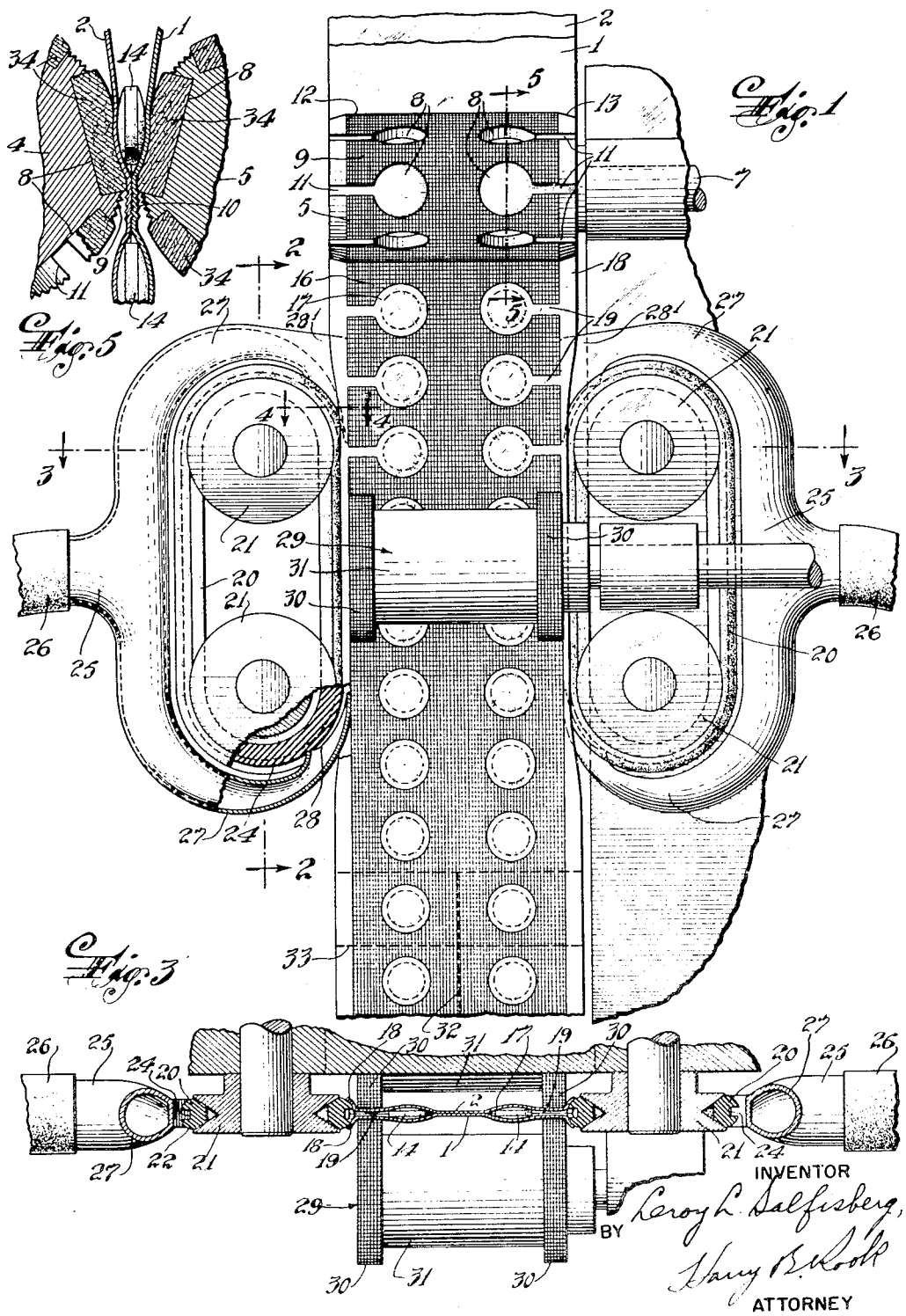

Patented Apr. 26, 1949

2,468,517

UNITED STATES PATENT OFFICE 2,468,517

METHOD AND MACHINE FOR PACKAGING OR WRAPPING OF ARTICLES

Leroy L. Salfisberg, South Orange, N. J., assignor to Ivers-Lee Company, Newark, N. J., a corporation of Delaware Application August 10, 1945, Serial No. 610,074

7 Claims. (Cl. 93—3)

This invention relates in general to a method and machine for packaging or wrapping of articles such as tablets or pills, or granular or powdered material, in containers or compartments whose thin flexible walls are formed of sheet material, for example, "cellophane," metal foil and the like, and especially sheet material which itself is thermoplastic and can be softened by heat or has a thermoplastic or adhesive coating, so that juxtaposed layers of the sheet material can be caused to adhere together by application of heat and pressure, or pressure alone, to form a seal.

It is well known that many articles and materials are deleteriously affected and in some cases spoiled by prolonged exposure to air, and modern packaging methods have been devised for enclosing such articles or materials in hermetically sealed compartments or receptacles from which substantially all air is exhausted to provide a partial vacuum. However, such receptacles generally have been of the rigid-walled, bottle or can type and heretofore no success has been achieved in attempting to produce a flexible-walled package of the type above-mentioned wherein the compartment containing the packaged article or substance is substantially devoid of air.

Therefore, a prime object of the invention is to provide a method of packaging articles or substance in flexible air-proof packaging material, which shall comprise novel and improved steps by which the article or granular or powdered material can be packed within a vacuum, or, in other words, the compartment that contains the article or the powdered or granular material can be hermetically sealed with all air exhausted, evacuated or expelled therefrom.

More particularly the invention contemplates a package of the type which comprises opposed layers of flexible packaging material sealed or bonded together in zones which form the margins or boundaries that encircle a compartment whose walls are the spaced portions of said layers bounded by said sealed zones; and another object of my invention is to provide a novel and improved method of making such a package and producing a vacuum in said compartment.

Further objects are to provide a novel and improved machine for making a flexible-walled package the compartment whereof containing the article or material shall be airtight, hermetically sealed and substantially devoid of air; and to provide such a machine whereby such packages can be formed, filled and sealed in a continuous operation, rapidly and efficiently.

Another object is provide a method and machine for producing a package of the specific character described such that the vacuum within the compartment shall draw the opposed flexible walls around the article or material in the compartment and into contact with each other so as to relieve the sealed zones of outward pressure from the article or material and also to hold the article or material against movement in the compartment.

Other objects, advantages and results will be brought out by the following description in conjunction with the accompanying drawing in which Figure 1 is a schematic front elevational view of apparatus for making packages in accordance with my invention.

Figure 2 is a transverse vertical sectional view on the line 2—2 of Figure 1.

Figure 3 is a horizontal sectional view on the line 3—3 of Figure 1.

Figure 4 is an enlarged fragmentary horizontal sectional view on the line 4—4 of Figure 1.

Figure 5 is an enlarged fragmentary transverse vertical sectional view approximately on the line 5—5 of Figure 1.

Figure 6 is a perspective view of one of the packages manufactured by my method and with the machine embodying the invention.

Figure 7 is a transverse vertical sectional view on the line 7—7 of Figure 6.

Figure 8 is a similar view showing the package opened, and

Figure 9 is a view similar to Figure 6 showing a modified form of package.

Specifically describing the illustrated embodiment of the invention, reference characters 1 and 2 designate two layers or strips of packaging material, for example "cellophane," metal foil, or other suitable material which is impervious to air and preferably moistureproof. Desirably the material is thermoplastic or has a thermoplastic or adhesive coating on one side thereof so that the two layers can be secured together under simultaneous application of heat and pressure, or pressure alone, to form substantially a hermetical seal. These strips 1 and 2 are led from a suitable source of supply over guide rollers 3 to a sealing and crimping mechanism which includes rollers 4 and 5 that receive the strips between them.

Each roller 4 and 5 frictionally contacts with one of the layers 1 and 2 so as to press said layer into contact with the other layer, the rollers being mounted to rotate on approximately parallel axes on the respective shafts 6 and 7 which are geared together to rotate in opposite directions, and one of which is connected to a suitable source of power in known manner. A machine of this general character is disclosed in my Patent No. 2,083,617 dated June 15, 1937. The shafts 6 and 7 may be journaled in a suitable frame, but for simplicity in illustration some supports for the shafts are omitted.

Each roller is shown as provided with two circumferential rows of peripheral recesses 8, and as shown, there are six recesses in each row so as to form two rows of package compartments between the strips 1 and 2 as will appear more fully hereinafter. It will be understood, of course, that the number of recesses in each row and the number of rows may be varied as desired. In surrounding relation to the recesses 8 the peripheries of the rollers have suitable roughened or serrated surfaces 9 for transversely crimping or corrugating and pressing together the strips 1 and 2 as indicated at 10, but said serrated surfaces are interrupted by grooves 11 one of which extends outwardly from each recess 8 to the outer edge of the serrated portion which terminates short of both ends of each roll as indicated at 12. Preferably, as shown, the end portion of each roll is beveled at 13 outwardly of the serrated surface.

In accordance with the present embodiment of the invention, each strip 1 and 2 is of sufficient width so that its longitudinal edges are disposed outwardly beyond the serrated surfaces of the roll, and in operation of the machine, the strips are led between the rolls 4 and 5 and are pressed and held together, after which articles such as tablets 14 are deposited by any suitable mechanism, for example through a discharge chute 15 into the space between the strips each in juxtaposition to the opposed recesses 8 in one of the circumferential rows of recesses in the rolls. As the rolls rotate, the layers are sealed around the tablets in zones 16 which form the boundaries of compartments 17 between the strips, in each of which one of the tablets is enclosed, but the longitudinal margins or edge portions of the strips will be unsealed and left free as indicated at 18; and also the portions of the strips juxtaposed to the grooves 11 will be unsealed as indicated at 19, so that there will be a passage-way between the strips through the unsealed portion 19 from the edge of the strips inwardly to each compartment 17.

After the strips have been sealed together as above described, substantially all of the air is exhausted from the compartments 17. For so exhausting the air, I have shown an endless belt 20 of rubber or other air-impervious material mounted on grooved pulleys or rollers 21 at each side of the strips, each belt having a convexly curved outer surface 22 and one reach of said belt being disposed between the free or unsealed edges 18 of the strips. These edges of the strips are in tight frictional contact with the convex surfaces of the belts as shown in Figure 3, and each belt also has a groove 24 opening through its convex surface and between the unsealed edges of the strips 1 and 2 so that suction may be exerted through said groove and the passages 19 upon the compartments 17 as the strips and the belts move along in contact with each other. It will be apparent to those skilled in the art that the belts should be driven by suitable means so that the strips 1 and 2 and belts will have substantially the same linear speed to avoid relative movement between the reaches of the belts and the free edges of the strips in contact therewith.

For exhausting the air from the compartments 17 through the grooves in the belts 20 I have provided a suction pipe 25 for each belt which may be connected by a tube 26 to any suitable suction-producing pump. Each pipe has two branches 27 at the extremity of each of which is a nozzle 28 whose edges are in tight frictional contact with walls of the groove 24 in the corresponding belt 20 adjacent one end of the reach of the corresponding belt that contacts with the free edges of the strips 1 and 2, said nozzle extending into the space between said strips and having a wedge-shaped portion 28' as clearly indicated in Figures 1 and 4 so that there will be a substantially air tight joint between the nozzles, the belt and the free edges of the strips 1 and 2.

With this construction, as the belts 20 and strips 1 and 2 move longitudinally and suction is produced in the pipes 25, substantially all of the air will be exhausted from the package compartments 17 as their passages 19 communicate with the groove 24 in the corresponding belt 20.

After the air has been exhausted from the compartments the passages 19 are closed by tightly sealing the strips 1 and 2 together, preferably with a heat-seal or thermo-bond, and I have shown for this purpose a pair of rolls 29 heated in any suitable manner and driven in opposite directions by any suitable means, each of which has circumferential end flanges 30 of a width approximately corresponding to the length of the unsealed portions 19 of the strips, and an intermediate portion 31 of smaller diameter than the flanges to provide a clearance for the articles or materials in the compartments 17. One roll 29 is disposed in contact with each strip and preferably the flanges 30 are serrated so as to operate upon the strips in the same manner as do the serrated portions 9 of the rolls 4 and 5, the rolls also serving to feed or advance the strips 1 and 2.

The packages as completed comprise a continuous strip or chain of packages as shown at the lower end of Figure 1 and this strip may be subdivided in any suitable manner to provide units comprising one or more of the compartments. For example, by dividing the package strip longitudinally and transversely as indicated by dot and dash lines 32 and 33 a plurality of packages each comprising one compartment may be produced.

In order to facilitate the expulsion of air from the compartment 17, the recesses 8 may have resilient pads 34 therein as shown in Figure 5 to snugly compress the strips 1 and 2 around the tablets 14 or other articles or materials being packaged, this snug contact of the strips with the tablets ensuring a minimum of air space within the compartment.

While the strips 1 and 2 may be so firmly sealed together that the package can be opened only by tearing, it is desirable that the seal between the strips be such that the strips can be pulled apart with a peeling action without tearing of the package material, for opening the package.

One of the packages formed according to the method and with the machine above-described is illustrated in Figure 6, this package including two opposed layers 35 and 36 of the packaging material which have the compartment 17 encircled and formed by sealed zones 37 produced by the serrated surfaces of the rolls 4 and 5 and the flanges 30 of the rolls 31. Along one margin, the two layers 35 and 36 are unsealed or free from each other as indicated at 39, constituting portions of the unsealed longitudinal edges 18 of the strips 1 and 2, these unsealed margins providing facile finger grips by which the two layers may be pulled apart as indicated in Figure 8 to open the package and release or discharge the article such as the tablet 14 therefrom.

Desirably, the unsealed edge portion 39 of one of the layers 35 and 36 projects beyond the corresponding edge portion of the other layer to facilitate initial separation of the layers for grasping with the fingers to peel apart the two layers. This may be accomplished by initially locating the strips 1 and 2 in the machine so that the edge of one of the strips projects beyond the corresponding edge of the other.

A modification of the package is shown in Figure 9 where instead of an approximately circular compartment, the package has a polygonal, particularly a pentagonal compartment 40 with one of the angles extending toward the free unsealed edges 41 of the package and disposed approximately midway of the width of the package. With such a construction, during opening of the package the sealed zones 42, corresponding to the zones 37, are initially pulled apart at the apex of said angle and then progressively pulled apart along the sides of the compartment. This construction ensures a substantially uniform tension on the sealed zones throughout opening of the package so that tendency to wrinkling or tearing of the layers of packaging material is minimized.

It will be observed that the sub-atmospheric pressure or vacuum in the compartment of the package will draw the walls of the compartment tightly around the tablet or other substance in the compartment and also tightly together in the zones between the margins of the article or substance and the sealed zones of the package. This relieves the outward pressure on the sealed portions of the package that might be caused by outward pressure of the articles incident to sliding or movement of the articles in the compartments toward the sealed zone.

Where the substance in the compartment is a powder, the above-mentioned action of the vacuum is especially effective in preventing spreading of the powder in the compartment and compensating for pressure on the walls of the compartment which would have a tendency to cause the powder to spread, the unsealed portions of the walls being yieldable under such pressure.

It will be understood by those skilled in the art that any desired number of articles may be placed in each compartment and that the compartment may be made of various sizes and shapes depending upon the material to be packaged. It will also be understood that the invention may be utilized in packaging powder by first forming the powder into tablets, sealing the tablets in the compartments and thereafter crushing the tablets into powder form by application of pressure, as between rolls or belts, upon the opposite walls of the compartment.

Many other modifications in the steps of the method and the construction of the machine and package will occur to those skilled in the art as within the spirit and scope of the invention.

What I claim is:

1. The steps in a method of making packages comprising continuously longitudinally feeding strips of flexible air-proof material in opposed relation to each other, making intermittent deposits of substance to be packaged between said strips, hermetically sealing said strips together in zones encircling said deposits of substance to form compartments enclosing said deposits, leaving said strips unsealed along one longitudinal edge and at certain zones to form openings leading outwardly from said compartments to said longitudinal edge of said strips, causing air-tight contact between said edges of said strips and a suction-producing means to form a partial vacuum in each compartment and hermetically sealing said strips to close said openings during said contact of said edges with said suction-producing means.

2. The steps in a method of making packages comprising depositing a substance to be packaged between and sealing together opposed layers of flexible air-proof material in zones to form a compartment enclosing said substance, leaving said layers unsealed and free along certain juxtaposed edge portions and at a certain zone leading between said compartment and said free edge portions to form an opening leading outwardly from said compartment, causing air-tight abutting contact of the inlet of a suction-producing means with said free edge portions of said strips around said opening, and sealing said opening during said application of suction.

3. A machine for making packages comprising means for arranging sheets of flexible packaging material in opposed relation to each other, means for depositing a substance to be packaged between said sheets, means for pressing said sheets together inwardly of certain juxtaposed edges of said sheets to seal the sheets together in certain zones and form a compartment enclosing said substance and whose walls are the spaced portions of said sheets encircled by said sealed zones and to leave said juxtaposed edges free and unsealed, said means being formed with clearance to prevent pressing of said sheets together at another zone of said sheets and thus leave the sheets at said other zones unsealed to form an opening between said sheets from said compartment to said free edge portions, suction-producing means having an inlet, and means for producing an air-tight connection between the walls of said inlet and said free edge portions in surrounding relation to said opening.

4. A machine for making packages comprising means for arranging sheets of flexible packaging material in opposed relation to each other means for depositing a substance to be packaged between said sheets, means for pressing said sheets together inwardly of certain juxtaposed edges of said strips to seal the sheets together in certain zones and form a compartment enclosing said substance and whose walls are the spaced portions of said sheets encircled by said sealed zones and to leave said juxtaposed edges free and unsealed, said means being formed with clearance to prevent pressing of said sheets together at another zone of said sheets and thus leave the sheets at said other zones unsealed to form an opening between said sheets from said compartment to said free edge portions, and means for forming a partial vacuum in said compartment including an elongate element having a longitudinal groove therein, means for establishing communication between a source of negative pressure and said groove at points spaced longitudinally of said groove, and means for positioning said strips with said free edge portions in tight contact with said element at opposite sides of said groove to establish communication between said compartment and said groove through said opening to create a negative pressure in said compartment.

5. A machine for making packages comprising means for arranging sheets of flexible packaging material in opposed relation to each other, means for depositing a substance to be packaged between said sheets, means for pressing said sheets together inwardly of certain juxtaposed edges of said strips to seal the sheets together in certain zones and form a compartment enclosing said substance and whose walls are the spaced portions of said sheets encircled by said sealed zones and to leave said juxtaposed edges free and unsealed, said means being formed with clearance to prevent pressing of said sheets together at another zone of said sheets and thus leave the sheets at said other zones unsealed to form an opening between said sheets from said compartment to said free edge portions, and means for forming a partial vacuum in said compartment including an elongate element having a longitudinal groove therein, means for positioning said sheets with their free edge portions in tight contact with said element at opposite sides of said groove, and two suction nozzles at spaced points longitudinally of said groove in substantially air-tight abutting contact with the walls of said groove and with said free-edge portions of said sheets.

6. The machine as defined in claim 4 with the addition of means for sealing said opening during the creation of said negative pressure in said compartment.

7. A machine of the character described comprising means for continuously feeding two opposed strips of flexible air-proof material, means for depositing a substance to be packaged between said strips, mechanism for pressing said strips together inwardly of certain juxtaposed edges of said strips to seal the strips together in certain zones and form compartments enclosing said substance and bounded by said zones and to leave said juxtaposed edge portions free and unsealed, said mechanism being formed with clearance to prevent pressing of said strips together at other zones of said strips and thus leave the strips at said other zones unsealed to form an opening between said sheets from each compartment to said free edge portions, and means for forming a partial vacuum in said compartments comprising a belt movable parallel to and at substantially the same linear speed as said strips between and in contact with said free edge portions, said belt having a longitudinal groove, and two suction nozzles at points spaced longitudinally of said groove in substantially air-tight abutting contact with the walls of said groove and with said free edge portions of said strips.

LEROY L. SALFISBERG.

REFERENCES CITED

The following references are of record in the file of this patent:

UNITED STATES PATENTS

| Number | Name | Date |
| --- | --- | --- |
| 1,970,193 | Riebel, Jr. | Aug. 14, 1934 |
| 2,083,617 | Salfisberg | June 15, 1937 |
| 2,292,295 | Royal | Aug. 4, 1942 |
| 2,336,962 | Salfisberg | Dec. 14, 1943 |
| 2,387,812 | Sonneborn et al. | Oct. 30, 1945 |
| 2,400,390 | Clunan | May 14, 1946 |